United States Patent
Beers et al.

(10) Patent No.: US 9,862,493 B2
(45) Date of Patent: Jan. 9, 2018

(54) MOTOR COOLING BLOWER AND CONTAINMENT STRUCTURE

(71) Applicant: Hamilton Sundstrand Corporation, Windsor Locks, CT (US)

(72) Inventors: Craig M. Beers, Wetherfield, CT (US); Harold W. Hipsky, Willington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 608 days.

(21) Appl. No.: 13/903,460

(22) Filed: May 28, 2013

(65) Prior Publication Data
US 2014/0357176 A1  Dec. 4, 2014

(51) Int. Cl.
*B64D 13/00* (2006.01)
*B64D 13/06* (2006.01)

(52) U.S. Cl.
CPC .............. *B64D 13/00* (2013.01); *B64D 13/06* (2013.01); *B64D 2013/0644* (2013.01); *Y02T 50/56* (2013.01)

(58) Field of Classification Search
CPC ............ Y02T 50/56; B64D 2013/0659; B64D 2013/0618; B64D 13/06
See application file for complete search history.

(56) References Cited

U.S. PATENT DOCUMENTS

| | | | |
|---|---|---|---|
| 2,743,163 A * | 4/1956 | Bunsen | C01B 31/20 123/76 |
| 2,793,506 A | 5/1957 | Moody | |
| 3,728,857 A | 4/1973 | Nichols | |

(Continued)

FOREIGN PATENT DOCUMENTS

| EP | 1801519 A1 | 6/2007 |
|---|---|---|
| EP | 2407380 A2 | 1/2012 |

(Continued)

OTHER PUBLICATIONS

European Search Report dated Jan. 30, 2015 for European Application No. 11173813.4. (6 pgs).

(Continued)

*Primary Examiner* — Steven B. McAllister
*Assistant Examiner* — Jonathan Cotov
(74) *Attorney, Agent, or Firm* — Cantor Colburn LLP

(57) ABSTRACT

A cabin air compressor assembly that include a cabin air compressor disposed at a compressor inlet and a cabin air compressor motor operably connected to the cabin air compressor. At least one cooling flow inlet is configured to direct a cooling flow through various pathways in the cabin air compressor assembly, including across the cabin air compressor motor. A blower is configured to boost the cooling flow across the cabin air compressor motor, thereby increasing cooling flow provided to the air compressor motor. A static seal plate is downstream of the blower and guides the boosted cooling flow toward a cooling flow exit. In addition, the static seal plate isolates boosted cooling flow from a moving rotor of the cabin air compressor, and also forms part of a containment structure that contains fragments and breakage that may come from the cabin air compressor rotor.

11 Claims, 3 Drawing Sheets

(56) References Cited

U.S. PATENT DOCUMENTS

| | | |
|---|---|---|
| 5,791,871 A | 8/1998 | Sech et al. |
| 6,164,084 A | 12/2000 | Watson et al. |
| 6,471,485 B1 * | 10/2002 | Rossmann ............... F01D 5/147 416/223 A |
| 6,681,592 B1 | 1/2004 | Lents et al. |
| 6,684,660 B1 | 2/2004 | Bruno et al. |
| 6,928,832 B2 | 8/2005 | Lents et al. |
| 7,074,010 B2 | 7/2006 | DeGroff et al. |
| 7,302,804 B2 | 12/2007 | Murry et al. |
| 7,305,842 B1 | 12/2007 | Schiff |
| 7,322,202 B2 | 1/2008 | Zywiak et al. |
| 7,334,422 B2 | 2/2008 | Zywiak et al. |
| 7,633,193 B2 | 12/2009 | Masoudipour et al. |
| 7,695,355 B2 | 4/2010 | Doherty |
| 7,828,874 B2 * | 11/2010 | Surawski ............... B64D 37/32 244/135 R |
| 2004/0261428 A1 * | 12/2004 | Murry ................... B64D 13/06 62/86 |
| 2006/0059941 A1 | 3/2006 | Merritt et al. |
| 2006/0067833 A1 | 3/2006 | McAuliffe et al. |
| 2007/0065317 A1 | 3/2007 | Stock |
| 2007/0101756 A1 | 5/2007 | Okuda et al. |
| 2009/0026061 A1 | 1/2009 | Gsell et al. |
| 2009/0217693 A1 | 9/2009 | Kikuchi et al. |
| 2011/0017426 A1 | 1/2011 | Baumgardt et al. |
| 2012/0011878 A1 | 1/2012 | Hipsky |

FOREIGN PATENT DOCUMENTS

| | | |
|---|---|---|
| EP | 2409919 A2 | 1/2012 |
| JP | 0255550 A | 2/1990 |
| JP | 2003120214 A | 4/2003 |
| JP | 2006290021 A | 10/2006 |
| JP | 2008514179 A | 5/2008 |
| WO | 2006011248 A1 | 2/2006 |
| WO | 2009080168 A1 | 7/2009 |

OTHER PUBLICATIONS

European Search Report Issued in EP Application No. 14169145.1; dated Oct. 13, 2014; 6 pages.

* cited by examiner

MOTOR COOLING BLOWER AND CONTAINMENT STRUCTURE

REFERENCE TO CO-PENDING APPLICATIONS FOR PATENT

The present Application for Patent is related to the following co-pending U.S. Patent Application: "CABIN AIR COMPRESSOR MOTOR COOLING" by Harold W. Hipsky, having U.S. application Ser. No. 12/838,078, filed Jul. 16, 2010, assigned to the assignee hereof, and expressly incorporated by reference herein.

FIELD OF DISCLOSURE

The subject matter disclosed herein relates to aircraft environmental control and aircraft containment. More specifically, the subject disclosure relates to the cooling of a cabin air compressor motor for an aircraft environmental control system, as well as a containment structure for a compressor rotor of the aircraft.

BACKGROUND

Environmental control systems (ECS) are utilized on various types of aircraft for several purposes, such as in cooling systems for the aircraft. For example, components of the ECS may be utilized to remove heat from various aircraft lubrication and electrical systems and/or used to condition aircraft cabin air. The cabin air conditioner includes one or more cabin air compressors (CACs) which compress air entering the system. The compressed air is delivered to an environmental control system to bring it to a desired temperature then delivered to the aircraft cabin. After passing through the cabin, the air is typically exhausted to the outside. The air is at least partially recycled. The CACs are typically driven by air-cooled electric motors, which are cooled by a flow of cooling air typically drawn by a ram air system. Ram air systems typically pull ambient air in through a Ram air inlet The flow of CAC motor cooling air and thus the performance of the electric motor and CAC are typically limited by the pressure drop from the CAC inlet to the ram air system. Such a limitation may result in reduced performance of the CAC. Thus, it would be advantageous to enhance the flow of cooling air. These and other issues are addressed by published U.S. Patent Application No. 2012-0011878-A1, which is owned by the assignee of the present disclosure, and is incorporated herein by reference in its entirety. U.S. Patent Application No. 2012-0011878-A1 discloses providing a blower in an exit channel of the aircraft engine. The blower increases a pressure differential and a mass flow, thereby increasing the flow of cooling air, thereby increasing the performance of the CAC and the ECS.

Aircraft compressors commonly include some form of containment structure for the rotors of the aircraft compressor. It is possible for rotors to fragment or break during operation. Thus, containment structures are provided to contain released blade fragments and/or broken rotor segments and prevent them from escaping the aircraft compressor. The effectiveness of the containment structure is generally improved with closer proximity of the containment structure to the rotor.

SUMMARY

The disclosed embodiments include an ECS comprising: a cooling gas inlet and a cooling gas exit connected by pathways wherein a pressure differential between said cooling gas inlet and said cooling gas exit draws cooling flow through said pathways; a movable blower disposed in at least one of the pathways that boosts a flow rate of said cooling flow; and a static structure; wherein said blower directs boosted cooling flow along a surface of said static structure toward said cooling gas exit.

The disclosed embodiments further include an ECS comprising: means for transporting cooling gas between a cooling gas inlet and a cooling gas exit; means for creating a pressure differential between said cooling gas inlet and said cooling gas exit that draws cooling flow through said means for transporting; means for boosting a flow rate of said cooling flow; and means for guiding said boosted cooling flow toward said cooling gas exit; wherein said means for boosting directs boosted cooling flow along a static surface of said means for guiding.

The disclosed embodiments further include a method of cooling a cabin air compressor assembly comprising: transporting cooling gas between a cooling gas inlet and a cooling gas exit; creating a pressure differential between said cooling gas inlet and said cooling gas exit that draws cooling flow through the assembly; boosting a flow rate of said cooling flow; and guiding said boosted cooling flow toward said cooling gas exit; wherein said boosting step also directs boosted cooling flow along a static surface.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
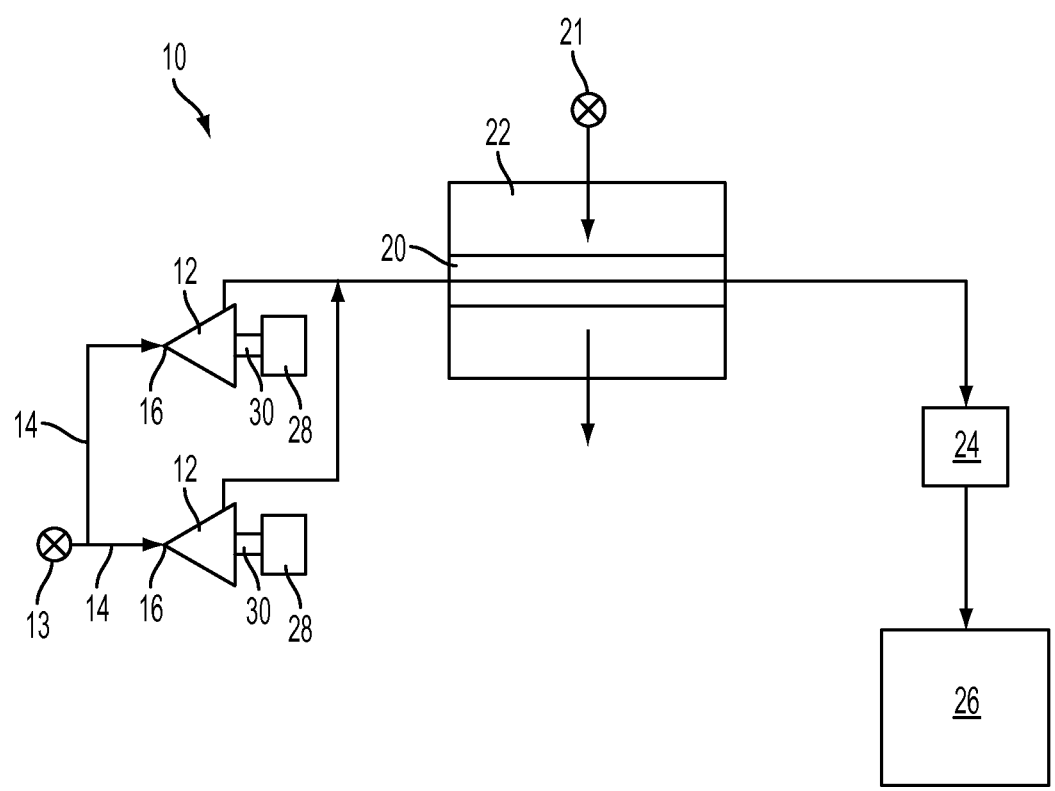
FIG. 1 is a partial schematic view of an environmental control system capable of utilizing the disclosed embodiments.

FIG. 1 is a schematic diagram of the pertinent portions of an environmental control system (ECS) 10 for an aircraft. ECS 10 includes one or more cabin air compressors (CACs) 12, which in some embodiments are centrifugal compressors. A gas flow 14, which is preferably air, is generated from outside the aircraft or from another source. The flow 14 moves through an inlet 13 and enters the CAC 12 at a compressor inlet 16. The CAC 12 compresses the flow 14 and urges the flow 14 from the compressor inlet 16 through various pathways that transport the flow 14 to a heat exchanger inlet 20, a ram system 22, an evaporator 24 and an aircraft cabin 26. The ram system 22 includes a ram fan inlet 21 that draws air into the ram system 22. Each CAC 12 is driven by a CAC motor 28 operably connected to the CAC 12 via a CAC shaft 30.

Figure 2:
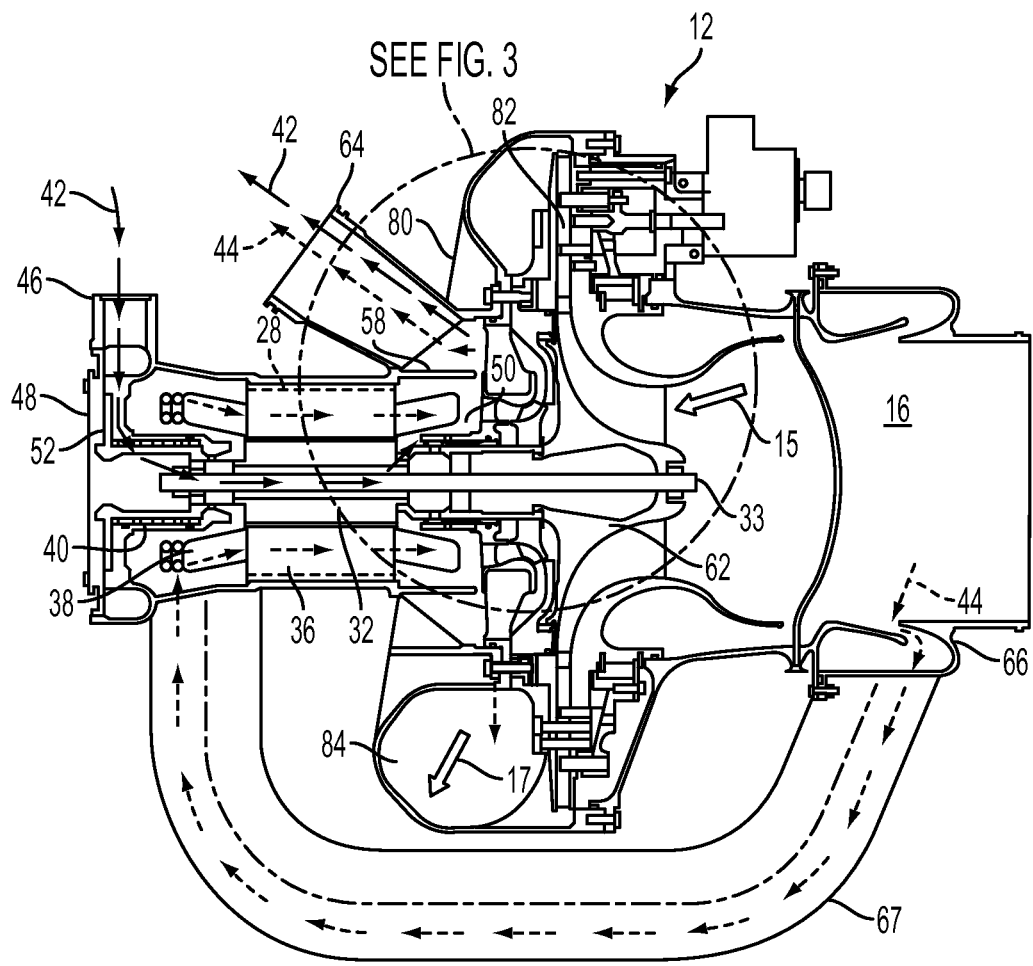
FIG. 2 is a cross sectional view of a cabin air compressor assembly of the disclosed embodiments.
Figure 3:
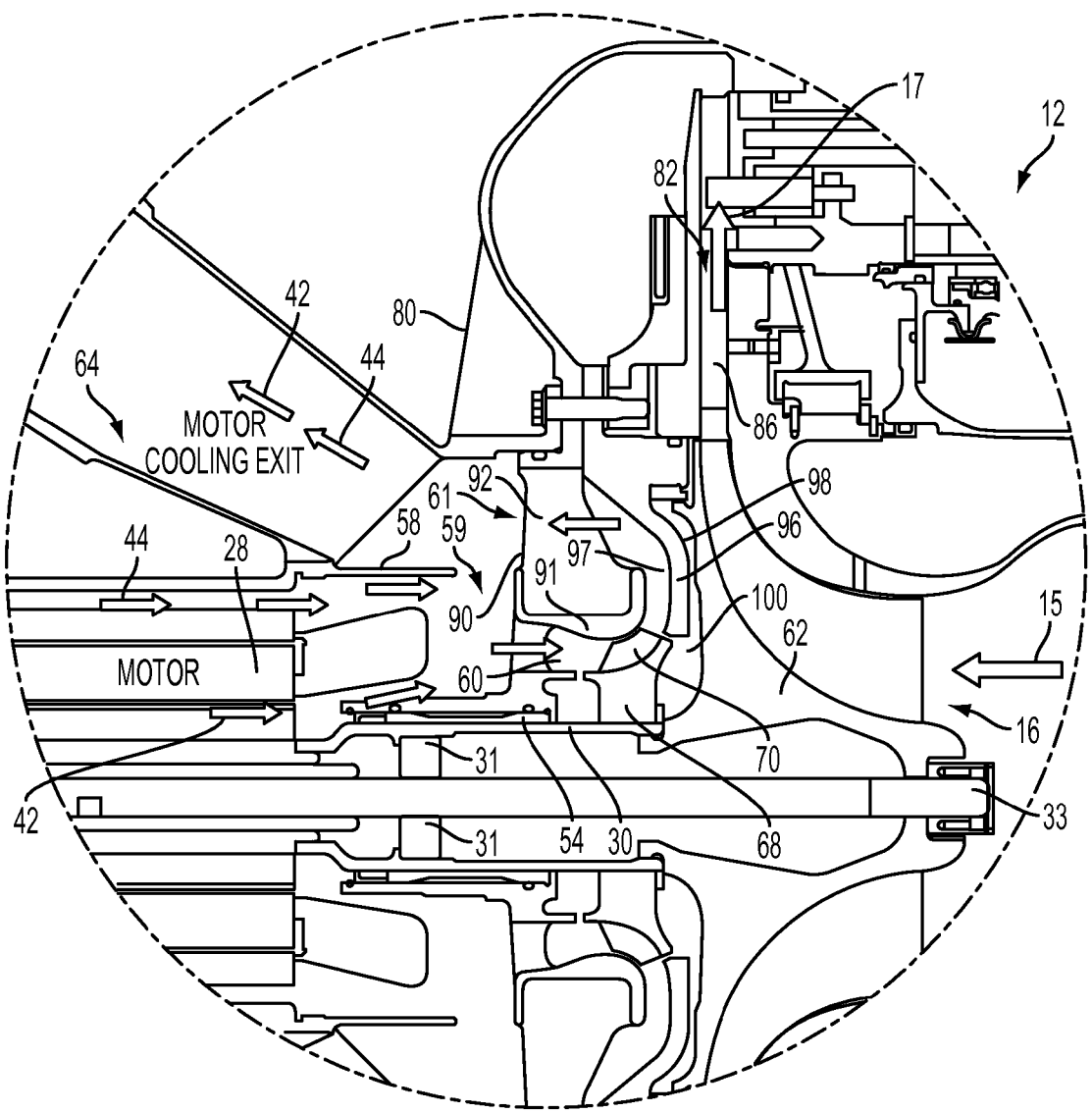
FIG. 3 is a more detailed and expanded cross sectional view showing a portion of the cabin air compressor assembly in FIG. 2.

FIGS. 2 and 3 are cross sectional views that illustrate more details of a CAC 12 embodying the present disclosure. FIG. 3 is an expanded view of the area identified by the dotted line in FIG. 2. Note that the following discussion refers to elements illustrated in both FIG. 2 and FIG. 3, and that certain elements within the dotted line of FIG. 2 are best illustrated in the expanded view shown in FIG. 3. For ease of illustration, the reference numbers for certain elements within the dotted line of FIG. 2 are only shown in FIG. 3. The compressor inlet 16 delivers gas 15 to be compressed to a CAC rotor 62. A main compressor exit 82 is positioned downstream of the CAC rotor 62. A main compressor diffuser 86 (best shown in FIG. 3) controls a cross-sectional flow area of the compressor exit 82. A compressor outlet 84 (shown in FIG. 2) outputs compressed gas 17 from the CAC 12. The CAC motor 28 is an electric motor in one embodiment and has a rotor 32 rotatably located at a CAC tie rod 33. The CAC motor 28, when implemented as an electric motor, also includes a stator 36 having a plurality of stator windings 38 disposed radially outboard of the rotor 32. The CAC motor 28 also includes one or more bearings 40 disposed at a CAC shaft 30 coupled through a compressor tie rod support 31 to a CAC tie rod 33. To prevent overheating of the CAC motor 28, particularly the stator windings 38 and the bearings 40, a cooling flow is drawn across the CAC motor 28. The cooling flow is driven generally by a pressure drop from the compressor inlet 16 to the ram system 22, for example, ram fan inlet 21 (as shown in FIG. 1). In some embodiments, as shown in FIGS. 2 and 3, the cooling flow includes a motor gap cooling flow 42 and a motor cooling flow 44. The motor gap cooling flow 42 is supplied via motor gap cooling inlet 46 at a first end 48 of the CAC motor 28 opposite a second end 50 at which the CAC 12 is disposed. The motor gap cooling flow 42 proceeds across thrust bearings 52 located at the first end 48, and across shaft bearings 54 located, for example, at the CAC shaft 30 at the first end 48 and/or the second end 50, thereby removing thermal energy from the thrust bearings 52 and the shaft bearings 54. The motor gap cooling flow 42 exits the CAC motor 28 and moves primarily into a blower gas path 60 (best shown in FIG. 3). The blower gas path 60 includes an inlet path section upstream of a plurality of blower blades 70, along with an exit path section immediately downstream of the plurality of blower blades 70. In some embodiments, the CAC motor 28 includes a motor shroud 58 which directs the motor gap cooling flow 42 primarily toward the blower gas path 60. A small portion of the motor gap cooling flow 42 directed by the motor shroud 58 may divert through a bleed opening 59 directly to a motor cooling exit 64.

The disclosed embodiments include a static structure that performs multiple functions, including for example, interference and/or isolation functionality, guide functionality and containment functionality. More specifically, the disclosed static structure guides cooling gas flow 42, 44, interferes with cooling gas flow 42, 44 impacting the compressor rotor 62, and provides some isolation of the cooling gas flow 42, 44 from the compressor rotor 62. The static structure further provides containment functionality by forming a part of a containment structure that forms a containment area 100 of the compressor rotor 62. In one embodiment as illustrated and described herein, the static structure may be implemented as a static seal plate 96 (best shown in FIG. 3) having a first seal plate surface 97 and a second seal plate surface 98.

As best shown in FIG. 3 collector 90 extends from the compressor housing 80 and includes a first collector section 91 and a second collector section 92. The blower gas path 60 is formed by the first collector section 91, the blower 68 and the first surface 97 of the static seal plate 96. After passing through the blower gas path 60, the motor gap cooling flow 42 proceeds substantially radially outwardly toward a collector gas path 61. The collector gas path 61 is formed by the second section 92 of the collector 90. The collector gas path 61 collects motor gap cooling flow 42 and directs it toward the motor cooling exit 64, which further feeds to, for example, the ram fan inlet 21 (shown in FIG. 1).

As best shown in FIG. 2, the motor cooling flow 44 is drawn from the compressor inlet 16, enters at a motor inlet 66 and proceeds toward the first end 48 via a cooling conduit 67. The motor cooling flow 44 proceeds through the CAC motor 28, substantially from the first end 48 to the second end 50 removing thermal energy from the stator windings 38 and other components of the CAC motor 28. As best shown in FIG. 3, the motor cooling flow 44 then proceeds on substantially the same path as the motor gap cooling flow 42, passing through the blower gas path 60, the collector gas path 61 and the motor cooling exit 64 toward, for example, the ram fan inlet 21 (shown in FIG. 1).

As best shown in FIG. 3, the blower 68 includes a plurality of blower blades 70 that extend into the blower gas path 60. The blower 68 is coupled to the compressor shaft 30 such that when the motor 28 operates to rotate the CAC rotor 62, the motor 28 also rotates the blower 60 and the blower blades 70. The rotating blower blades 70 urge the motor gap cooling flow 42 and the motor cooling flow 44 through the blower gas path 60. Inclusion of the blower 68 in the CAC 12 increases the pressure differential between the compressor inlet 16 and the ram fan inlet 21 (shown in FIG. 1) and increases a mass flow of the motor gap cooling flow 42 and the motor cooling flow 44 across the CAC motor 28. The increased pressure differential and increased mass flow increase the cooling of the CAC motor 28 thus increasing performance of the CAC 12 and the ECS 10. An example of providing a blower integral with the compressor rotor is shown in U.S. Patent Application No. 2012-0011878-A1, which is incorporated herein by reference. An example of providing a blower separate from the compressor rotor is described and illustrated in the present disclosure. Thus, the blower 68 may be either separate from or integral with the compressor rotor 62. Because cooling flow is low temperature, where the blower 68 is a separate element from the compressor rotor 62, the blower 68 may be made from lightweight materials such as aluminum, plastic or composite. The first seal plate surface 97 forms a portion of the exit path section of the blower gas path 60 and essentially isolates cooling flow 42, 44 from the rotating compressor rotor 62. Because the seal plate 96 is static and does not move, as the cooling flow 42 44 moves downstream of the blower 68 the cooling flow 42, 44 is not subject to additional swirl from the rotating compressor rotor 62.

In addition to boosting and guiding motor gap cooling flow 42 and motor cooling flow 44, the blower 68 and the static seal plate 96 also form a containment structure that defines a containment area 100 (best shown in FIG. 3) for the compressor rotor 62. Aircraft compressors commonly include some form of containment structure for the rotors of the aircraft compressor. It is possible for rotors to fragment or break. Thus, the containment structure 68, 96 functions to contain released blade fragments and prevent them from escaping the aircraft compressor. In one instance, the effectiveness of the containment structure 68, 96 may be generally improved because mounting the blower 68 to the compressor shaft 30 as shown allows the static seal plate 96 to be placed in relatively close proximity to the compressor rotor 62.

Accordingly, it can be seen from the foregoing disclosure and the accompanying illustrations that one or more embodiments may provide some advantages. For example, the blower 68 and the static seal plate 96 fulfill multiple roles. The blower's 68 roles and features include but are not limited to (i) forming part of the blower gas path 60 for passing cooling flow 42, 44, (ii) boosting cooling flow 42, 44, (iii) forming part of the containment structure 68, 96 for the compressor rotor 62, (iv) coupling the blower 68 to the compressor shaft 30 to allow the static seal plate 96 to be place in relatively close proximity to the compressor rotor 62, thereby keeping the containment area 100 relatively small, which is optimum, and (v) where the blower 68 is not integral with the compressor rotor 62, allowing the blower 68 to be made from lightweight materials such as aluminum, plastic or composite. The static seal plate's 96 roles and features include but are not limited to (i) forming part of the exit path section of the blower gas path 60, (ii) interfering with and/or providing some isolation of cooling flow 42, 44 to limit the cooling flow 42, 44 from impacting the compressor rotor 62 to thereby reduce the potential for the rotating compressor to add swirl to the cooling flow 42 44, (iii) guiding the cooling flow 42, 44 into the collector gas path 61 and toward the motor cooling exit 64, (iv) forming part of the containment structure 68, 96 for the compressor rotor 62, and (v) in combination with the location of the blower 68 on the compressor shaft 30, allowing the static seal plate 96 to be placed in relatively close proximity to the compressor rotor 62, thereby keeping the containment area 100 relatively small, which is optimum. Because cooling flow is low temperature, both the blower 68 and the static seal plate 96 can be constructed from lightweight material that does not add significant weight to the aircraft compressor. Also, adding the blower 68 increases the axial length of the compressor/blower rotor by less than 5%.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An ECS comprising:
a cooling gas inlet and a cooling gas exit connected by pathways, wherein a first pressure differential between said cooling gas inlet and said cooling gas exit is sufficient to draw cooling flow through at least one of said pathways at a flow rate;
a movable blower disposed in said at least one of said pathways, wherein said movable blower is configured to apply a second pressure differential between said cooling gas inlet and said cooling gas exit, wherein said second presser differential is sufficient to boost said first pressure differential and boost said flow rate of said cooling flow to generate a boosted cooling flow downstream of said movable blower; and
a static structure positioned downstream of said movable blower;
wherein said blower directs said boosted cooling flow through said at least one of said pathways and along a surface of said static structure toward said cooling gas exit.

2. The ECS of claim 1 wherein said static structure further comprises a static seal plate.

3. The ECS of claim 1 further comprising:
a cabin air compressor rotor; and
wherein said static structure interferes with said boosted cooling flow impacting said cabin air compressor rotor.

4. The ECS of claim 1 wherein said blower comprises a plurality of blower blades.

5. The ECS of claim 1 further comprising said blower movably coupled to a compressor shaft.

6. The ECS of claim 1 further comprising:
a cabin air compressor rotor; and
said movable blower is separate from said air compressor rotor.

7. The ECS of claim 6 wherein said movable blower is constructed from a lighter material than said air compressor rotor.

8. The ECS of claim 1 further comprising:
a cabin air compressor rotor; and
a containment structure for said compressor rotor comprising said static structure.

9. The ECS of claim 8 wherein said movable blower is positioned upstream from said static structure such that said moveable blower does not interfere with how close said structure is to said compressor rotor.

10. The ECS of claim 9 wherein said containment structure further comprises a portion of said movable blower.

11. The ECS of claim 8, wherein said containment structure for said compressor rotor further comprises said movable blower.

* * * * *